United States Patent
Maro et al.

(10) Patent No.: US 11,865,964 B2
(45) Date of Patent: Jan. 9, 2024

(54) OPTICAL APPARATUS, METHOD FOR MANUFACTURING OPTICAL APPARATUS, AND HEADLIGHT

(71) Applicant: MAXELL, LTD., Kyoto (JP)

(72) Inventors: Tsuyoshi Maro, Otokuni-gun (JP); Atsushi Yusa, Otokuni-gun (JP); Naoki Hiratoge, Yokohama (JP); Junichi Yokoyama, Yokohama (JP)

(73) Assignee: MAXELL, LTD., Otokuni-gun (JP)

(*) Notice: Subject to any disclaimer, the term of this patent is extended or adjusted under 35 U.S.C. 154(b) by 0 days.

(21) Appl. No.: 17/910,973

(22) PCT Filed: Mar. 4, 2021

(86) PCT No.: PCT/JP2021/008488
§ 371 (c)(1),
(2) Date: Sep. 12, 2022

(87) PCT Pub. No.: WO2021/182303
PCT Pub. Date: Sep. 16, 2021

(65) Prior Publication Data
US 2023/0139866 A1    May 4, 2023

(30) Foreign Application Priority Data
Mar. 13, 2020 (JP) .................. 2020-043856

(51) Int. Cl.
*B60Q 1/00* (2006.01)
*G02B 7/02* (2021.01)
(Continued)

(52) U.S. Cl.
CPC ......... *B60Q 1/0035* (2013.01); *B60Q 1/0088* (2013.01); *G02B 7/023* (2013.01); *G02B 7/24* (2013.01); *G02B 13/002* (2013.01)

(58) Field of Classification Search
CPC .... B60Q 1/0035; B60Q 1/0088; G02B 7/023; G02B 7/24
See application file for complete search history.

(56) References Cited

U.S. PATENT DOCUMENTS 9,417,454 B2 * 8/2016 Johnson ............... H04N 13/305
10,837,613 B2 * 11/2020 Pellarin ................ F21S 41/323
(Continued)

FOREIGN PATENT DOCUMENTS

JP    H08-130301 A    5/1996
JP    2001-213322 A   8/2001
(Continued)

OTHER PUBLICATIONS

May 18, 2021 International Search Report issued in International Patent Application No. PCT/JP2021/008488.

*Primary Examiner* — Matthew J. Peerce
(74) *Attorney, Agent, or Firm* — Oliff PLC

(57) ABSTRACT

An optical apparatus capable of correcting field curvature easily, a method for manufacturing the optical apparatus, and a headlight including the optical apparatus. A lens, a plurality of solid-state light sources, and a substrate on which the solid-state light sources are mounted. The substrate includes a base material, which is rigid, and a mount surface, which is formed on the base material in a curved surface shape that substantially matches a focal plane shape of the lens, and on which a circuit pattern is formed. The solid-state light sources are mounted on the mount surface, and the substrate is positioned with respect to the lens such that a position of a focal plane of the lens substantially coincides with emission surfaces of the solid-state light sources, and thus field curvature can be easily corrected.

12 Claims, 8 Drawing Sheets

(51) Int. Cl.
*G02B 7/24* (2021.01)
*G02B 13/00* (2006.01)

(56) References Cited

U.S. PATENT DOCUMENTS

| | | | |
|---|---|---|---|
| 2001/0019486 A1* | 9/2001 | Thominet | F21S 41/125 362/543 |
| 2004/0223337 A1 | 11/2004 | Ishida | |
| 2015/0377453 A1 | 12/2015 | Ji et al. | |
| 2019/0113199 A1 | 4/2019 | Pellarin et al. | |

FOREIGN PATENT DOCUMENTS

| | | |
|---|---|---|
| JP | 2001-266620 A | 9/2001 |
| JP | 2004-214144 A | 7/2004 |
| JP | 2004-327188 A | 11/2004 |
| JP | 2011-171002 A | 9/2011 |
| JP | 2017-157669 A | 9/2017 |

* cited by examiner

[Fig.1]
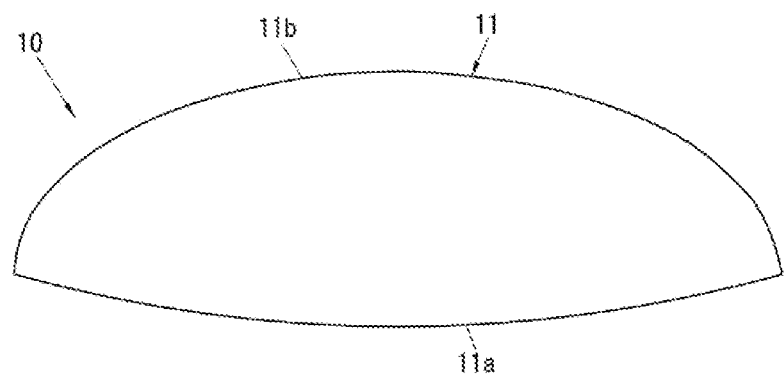
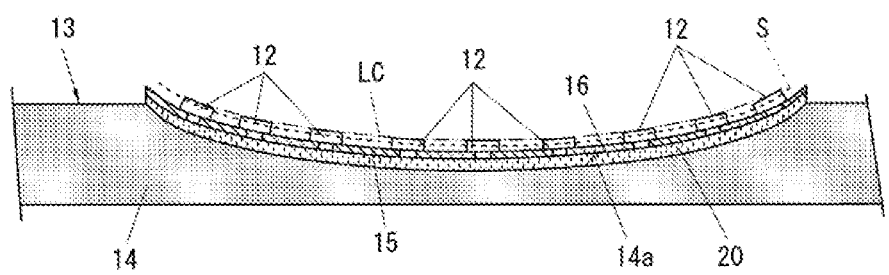

[Fig.2]
(a)
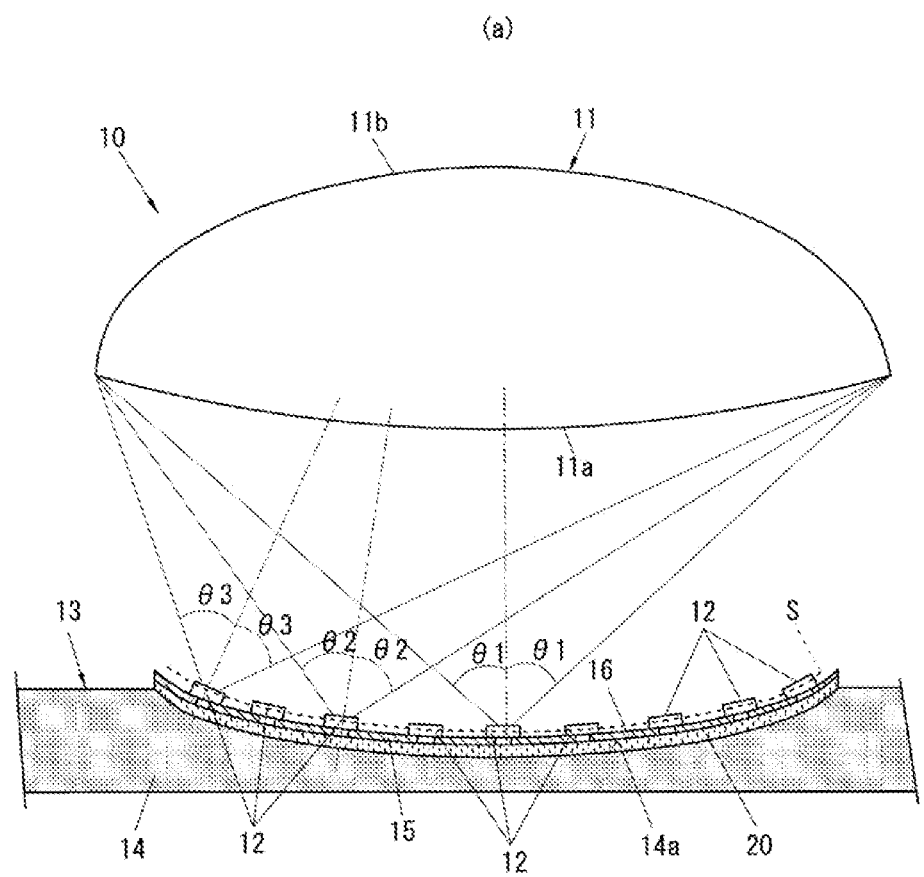
(b)
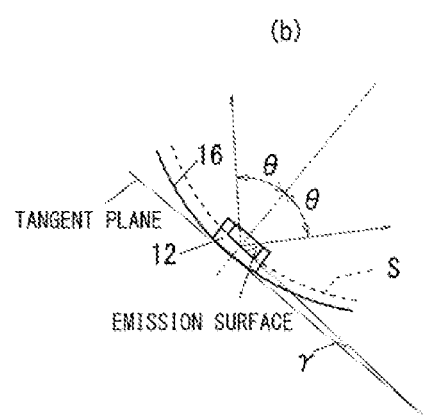

[Fig.2A]
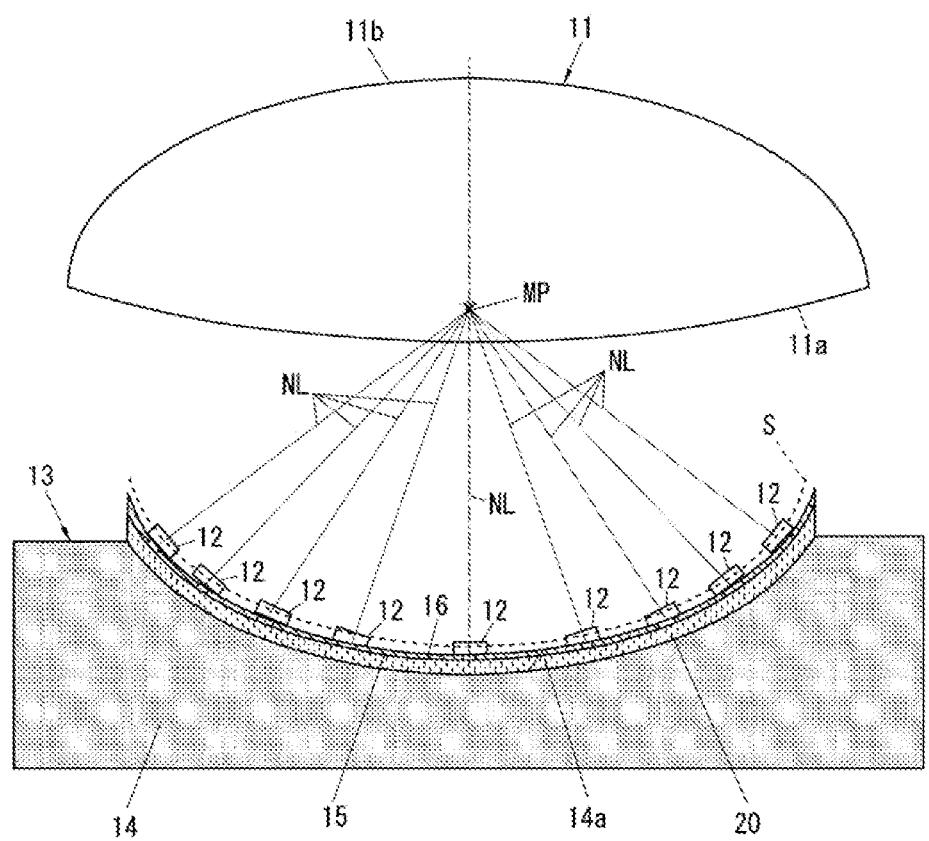

[Fig.2B]
(a)
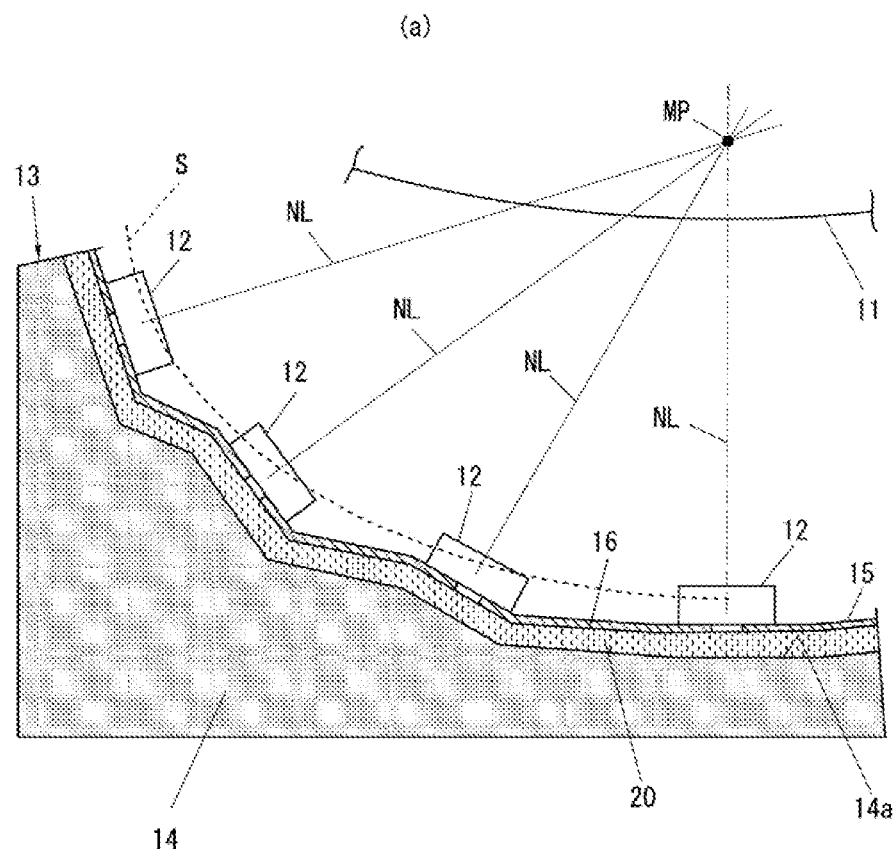
(b)
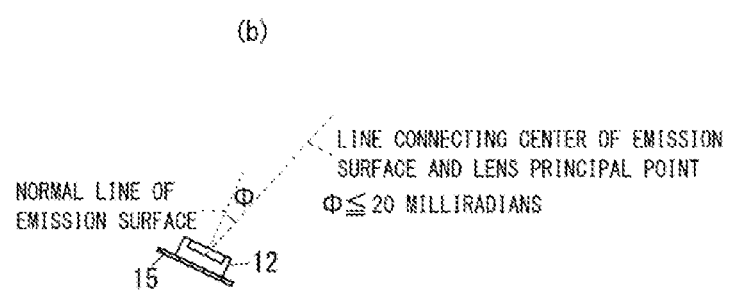

[Fig.3]
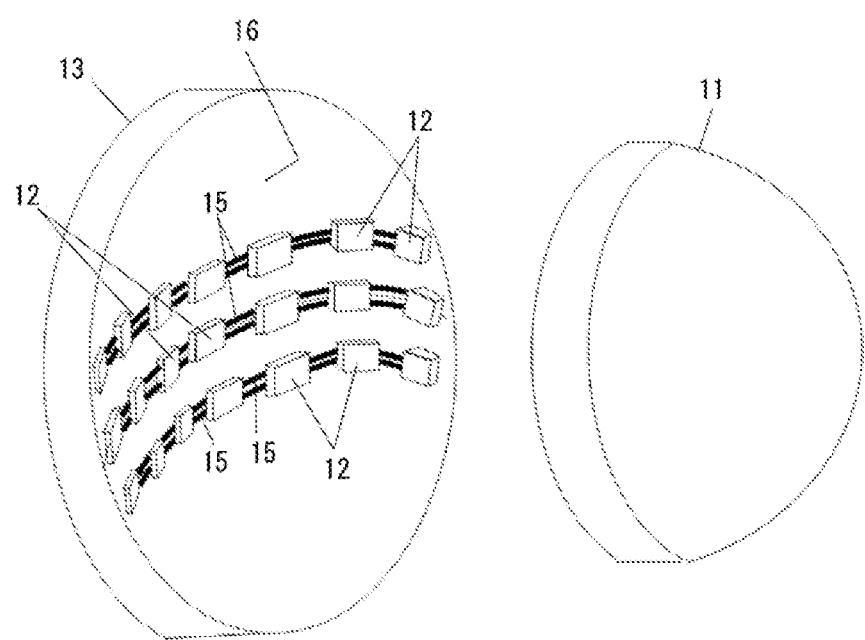

OPTICAL APPARATUS, METHOD FOR MANUFACTURING OPTICAL APPARATUS, AND HEADLIGHT

TECHNICAL FIELD

The present invention relates to an optical apparatus, a method for manufacturing the optical apparatus, and a headlight.

BACKGROUND ART

For example, a printed board on which a light-emitting diode of a chip type is mounted as a light-emitting part is attached to a vehicular headlight. It is necessary to attach such a printed board to the headlight, ensuring positional accuracy of an optical axis of the headlight and the light-emitting diode. Hence, the printed board is positioned by fitting a positioning hole provided beforehand in the printed board into the headlight, and is fixed by a screw or the like through an attachment hole. However, the light-emitting diode of the printed board is fixed by soldering so as to freely move independently of the positioning hole. Hence, there is a problem in that it is difficult to attach the printed board to the headlight, ensuring the positional accuracy of the headlight and the light-emitting diode. The vehicular headlight includes a printed board, on which an LED as a light-emitting part is mounted, and a lens that condenses light emitted from the LED and emits the light.

It is necessary to attach the printed board to the headlight, ensuring the positional accuracy of the optical axis of the lens and the LED.

For example, Patent Literature 1 describes an electronic apparatus provided with a printed board including a resin material of a flat plate, a circuit pattern formed of a metal film on one surface side of the resin material, an electronic component fixed to the circuit pattern by soldering and constituted of a light-emitting diode of a chip type that is used for a vehicular headlight and that generates heat by current application, a core material made of metal that is joined to an opposite surface side to the circuit pattern of the resin material and dissipates the heat of the electronic component, an escape part opened in the core material, and a positioning hole provided in the escape part and bored in the resin material with the position of the electronic component as a reference.

CITATION LIST

Patent Literature

Patent Literature 1: JP 2017-157669 A

SUMMARY OF INVENTION

Technical Problem

For example, as the optical apparatus mounted on the headlight, by the way, in a case where a plurality of solid-state light sources such as LEDs are mounted on a printed board having a flat plate shape, and when light is emitted from such solid-state light sources toward a lens positioned on its front side, a problem of field curvature may occur depending on the size of the lens.

The field curvature refers to a phenomenon in which, when a flat surface is focused on, an image plane does not become a flat one, and forms an image on an image plane curved in a curved surface shape. For this reason, when a screen central part is focused on, a perimeter part is blurred. Conversely, when the perimeter part is focused on, the central part is blurred.

The light emitted from the plurality of solid-state light sources toward the lens is refracted by the lens, and is then emitted from the emission surface of the lens toward the outside. Generally speaking, in a case where the solid-state light sources are disposed on a surface perpendicular to the optical axis at the focal position of a convex lens, the light emitted from the solid-state light sources positioned at the optical axis of the lens and in the vicinity of the optical axis become parallel light substantially parallel to the optical axis by the convex lens and is emitted from the emission surface of the lens. However, as the solid-state light source is away from the optical axis of the lens, the light emitted from the emission surface of the lens does not become the parallel light substantially parallel to the optical axis due to the field curvature, and the light is emitted in a direction intersecting the optical axis, resulting in condensed light.

In order to correct such field curvature, in general, a plurality of lenses are used, and a convex lens and a concave lens are used in combination so as to correct the focal plane to be substantially flat. However, the use of the plurality of lenses needs materials and assembling costs. In addition, the total length of the optical system is increased, thus making it difficult to downsize the apparatus. On the other hand, in order to correct the field curvature with use of a single lens, there is a conceivable method for arranging the solid-state light sources at one place in a concentrated manner. However, the light-emitting efficiency of the solid-state light sources necessitates a light-emitting area in order to obtain a predetermined light amount, heat generation at the time of light emission causes the solid-state light sources to be spaced apart from each other to some extent, and the light-emitting sources spread and will be affected by the field curvature. In a case where the solid-state light sources are disposed in a distributed manner, the solid-state light sources such as a plurality of LEDs may be disposed on the printed board along a curved surface shape that substantially matches the focal plane shape of the lens.

However, the printed board has a mount surface that is a flat surface, thus making it difficult to dispose the plurality of solid-state light sources as described above.

In addition, it is also conceivable that the plurality of solid-state light sources are mounted on a flexible board and the flexible board is curved into a curved surface shape that substantially matches the focal plane shape of the lens. However, although the flexible board can be curved in a certain cross-section, it is difficult to curve the flexible board into a concave curved shape in two intersecting cross-sections.

Therefore, it is difficult to correct the field curvature easily in the optical apparatus including a single lens, the plurality of solid-state light sources, and the board on which the solid-state light sources are mounted.

The present invention has been made in view of the above circumstances, and has an object to provide an optical apparatus capable of correcting field curvature easily, a method for manufacturing the optical apparatus, and a headlight including the optical apparatus.

Solution to Problem

In order to address the above issues, an optical apparatus of the present invention is an optical apparatus including a lens, a plurality of solid-state light sources, and a substrate on which the solid-state light sources are mounted, in which the substrate includes a base material that is rigid, and a mount surface, which is formed on the base material, which has a curved surface shape that substantially matches a focal plane shape of the lens, and on which a circuit pattern is formed, the solid-state light sources are mounted on the mount surface, and the substrate is positioned with respect to the lens such that a line connecting centers of light-emitting surfaces of the plurality of solid-state light sources substantially coincides with a focal plane of the lens in a cross-sectional view, or the line is present at a position spaced apart from the focal plane in an optical axis direction of the lens.

Here, in a case where the mount surface having a curved surface shape that substantially matches the focal plane shape of the lens is formed on the base material, the mount surface may be directly formed on the surface of the base material, or may be indirectly formed via an insulating layer, as will be described later.

In addition, the solid-state light source denotes a solid-state device that supplies a certain solid body (substance) with energy such as electricity and emits light specific to the substance when excited. Typical examples include a light-emitting diode (LED), a semiconductor laser (LD), and an organic EL (OEL).

In the present invention, the substrate includes the mount surface formed on the base material that is rigid, and formed in a curved surface shape that substantially matches a focal plane shape of the lens, the solid-state light sources are mounted on such a mount surface, and the substrate is positioned with respect to the lens such that the line connecting the centers of the light-emitting surfaces of the plurality of light sources substantially coincides with the focal plane of the lens in a cross-sectional view, or the line is present at a position spaced apart from the focal plane in the optical axis direction of the lens. Therefore, the field curvature can be easily corrected by the lens such that the light emitted from the plurality of solid-state light sources toward the lens is made to emit from the lens as parallel light substantially parallel to the optical axis.

Further, in the above configuration of the present invention, the base material may be formed of metal, ceramic, or a highly heat-conductive resin, and may include a formation surface formed in a curved surface shape that substantially matches the focal plane shape of the lens, and an insulating layer may be formed on the formation surface, the insulating layer having an electrical insulation property and including a surface to serve as the mount surface.

According to such a configuration, the base material is formed of metal, ceramic, or a highly heat-conductive resin. Thus, heat generated by the solid-state light sources can be partially transferred to the base material and dissipated from the base material, so that the solid-state light sources can be prevented from overheating.

In addition, the base material includes the formation surface formed in the curved surface shape that substantially matches the focal plane shape of the lens, and the insulating layer including the surface to serve as the mount surface is formed on the formation surface. Therefore, the surface of the insulating layer, that is, the mount surface can be easily formed in the curved surface shape that substantially matches the focal plane shape of the lens.

Further, in the above configuration of the present invention, the substrate may be positioned with respect to the lens such that a position of the focal plane of the lens substantially coincides with positions of emission surfaces of the solid-state light sources.

According to such a configuration, the substrate is positioned with respect to the lens such that the focal plane of the lens substantially coincides with the emission surfaces of the solid-state light sources. Therefore, the field curvature can be easily corrected by using this configuration such that light emitted from the plurality of solid-state light sources toward the lens is made to emit from the lens as parallel light substantially parallel to the optical axis.

Further, in the above configuration of the present invention, at least one another insulating layer may be stacked on the insulating layer, the at least one another insulating layer being formed in a curved surface shape that substantially matches the focal plane shape of the lens and including a mount surface on which a circuit pattern is formed, and the circuit patterns of a plurality of the insulating layers may be electrically connected to be selective by a through hole formed in the insulating layer.

According to such a configuration, the plurality of insulating layers positioned with respect to the lens are included, and thus the mount surface that is the surface of each insulating layer is to be positioned with respect to the lens. Therefore, also in a case where the solid-state light sources having different wavelengths are respectively mounted on the mount surface appropriately, the field curvature can be easily corrected.

In addition, the circuit patterns on the plurality of insulating layers are electrically connected to be selective by the through holes. Therefore, turning on and off the plurality of solid-state light sources connected with the respective circuit patterns can be easily controlled.

Further, in the above configuration of the present invention, the curved surface shape may be an aspherical shape.

In this manner, by making the curved surface shapes of the mount surface and the formation surface in an aspherical shape, the field curvature can be easily corrected, also in a case where the lens includes a light-receiving surface and an emission surface in the aspherical shape.

Further, in the above configuration of the present invention, the mount surface may be positioned with respect to the lens in accordance with a wavelength of the solid-state light source.

Here, positioning the mount surface with respect to the lens in accordance with the wavelength of the solid-state light source means positioning the mount surface with respect to the lens such that the distance between the emission surface of the solid-state light source and the lens is made to substantially match the focal distance of the light of the solid-state light source having a predetermined wavelength, because the focal distance of the solid-state light source varies depending on its wavelength.

In this manner, the mount surface is positioned with respect to the lens in accordance with the wavelength of the solid-state light source, and thus the field curvature can be easily corrected by appropriately mounting the solid-state light sources having different wavelengths on the mount surface.

In addition, by using such a method, the offset with respect to the focal position can be optionally set with respect to the individual solid-state light source. Therefore, parallel light, condensed light, and diffused light can also be made to emit by a single light source apparatus.

Further, in the above configuration of the present invention, the solid-state light sources may be mounted such that angles at which the lens is viewed from normal directions of emission surfaces of the solid-state light sources are substantially equal in angle to each other.

According to such a configuration, the solid-state light sources are mounted such that the angles at which the lens is viewed from the normal directions of the emission surfaces of the solid-state light sources are substantially equal in angle to each other, and thus the lens can be uniformly irradiated with the light emitted from the solid-state light sources.

Further, in the above configuration of the present invention, the solid-state light sources may be mounted such that normal lines of emission surfaces of the solid-state light sources pass through a front-side principal point (principal point on a light source side) of the lens or its vicinity. According to such a configuration, it is advantageous in the utilization efficiency of the light emitted from the solid-state light sources, in some cases.

Further, in the above configuration of the present invention, the solid-state light sources may be mounted such that an angle formed by an emission surface of the solid-state light source and a tangent plane of the mount surface falls within 20 milliradians.

According to such a configuration, the solid-state light sources can be mounted on the mount surface in a state close to an ideal state.

In addition, a method for manufacturing an optical apparatus of the present invention is a method for manufacturing an optical apparatus including a lens, a plurality of solid-state light sources, and a substrate on which the solid-state light sources are mounted, the method including:

forming an insulating layer on a base material that is rigid, the insulating layer including a mount surface such that a line connecting centers of light-emitting surfaces of the plurality of solid-state light sources substantially coincides with a focal plane of the lens in a cross-sectional view, or the line is present at a position spaced apart from the focal plane in an optical axis direction of the lens, and forming a circuit pattern on the mount surface to manufacture the substrate;

then, mounting the solid-state light sources on the mount surface of the substrate to be electrically connected with the circuit pattern; and then, positioning the substrate with respect to the lens such that a position of the focal plane of the lens substantially coincides with positions of emission surfaces of the solid-state light sources.

In the present invention, the solid-state light sources are mounted on the mount surface of the insulating layer, and the substrate is positioned with respect to the lens such that the focal plane of the lens substantially coincides with the emission surfaces of the solid-state light sources. Therefore, the field curvature can be easily corrected by the lens such that the light emitted from the solid-state light sources toward the lens is made to emit from the lens as parallel light substantially parallel to the optical axis.

In addition, another method for manufacturing an optical apparatus of the present invention is a method for manufacturing an optical apparatus including a lens, a plurality of solid-state light sources, and a substrate on which the solid-state light sources are mounted, the method including:

forming an insulating layer on a base material that is rigid, the insulating layer including a mount surface such that a line connecting centers of light-emitting surfaces of the plurality of solid-state light sources substantially coincides with a focal plane of the lens in a cross-sectional view, or the line is present at a position spaced apart from the focal plane in an optical axis direction of the lens, and forming a circuit pattern on the mount surface;

then, repeating a predetermined number of times a step of forming, on the mount surface, a next insulating layer including a mount surface such that a line connecting centers of light-emitting surfaces of the plurality of solid-state light sources substantially coincides with a focal plane of the lens in the cross-sectional view, or the line is present at a position spaced apart from the focal plane in the optical axis direction of the lens, and forming a circuit pattern on the mount surface to manufacture the substrate;

then, mounting the solid-state light sources on the mount surface of the substrate to be electrically connected with the circuit pattern; and then, positioning the substrate with respect to the lens such that a position of the focal plane of the lens substantially coincides with positions of emission surfaces of the solid-state light sources.

In the present invention, the solid-state light sources are respectively mounted on the mount surfaces of the plurality of insulating layers, and the substrate is positioned with respect to the lens such that the focal plane of the lens substantially coincides with the emission surfaces of the solid-state light sources. Therefore, the field curvature can be easily corrected by this configuration such that light having different wavelengths emitted from the plurality of solid-state light sources toward the lens is made to emit from the lens as parallel light substantially parallel to the optical axis.

Further, in the above configuration of the present invention, the circuit patterns of a plurality of the insulating layers may be electrically connected to be selective by a through hole formed in the insulating layer.

According to such a configuration, the circuit patterns on the plurality of insulating layers are electrically connected to be selective by the through holes, and thus turning on and off the plurality of solid-state light sources connected with the respective circuit patterns can be easily controlled.

A headlight of the present invention includes the above-described optical apparatus.

According to such a headlight, the field curvature can be easily corrected.

Advantageous Effects of Invention

According to the present invention, the field curvature can be easily corrected.

BRIEF DESCRIPTION OF DRAWINGS

FIG. 1 illustrates an optical apparatus according to a first embodiment of the present invention, and is a schematic cross-sectional view schematically illustrating a schematic configuration.

FIG. 2 is a view for describing a relationship between light emitted from solid-state light sources and a lens of the same, in which (a) is a schematic cross-sectional view of the optical apparatus, and (b) is an enlarged schematic view of a substantive part.

FIG. 2A is a schematic cross-sectional view for describing a relationship between light emitted from the solid-state light sources and the lens of the optical apparatus of the same.

FIG. 2B is a view for describing the shape of a substrate part on which the solid-state light sources are mounted, in which (a) is a schematic cross-sectional view, and (b) is an enlarged schematic view of a substantive part.

FIG. 3 is an exploded perspective view of the optical apparatus of the same.

DESCRIPTION OF EMBODIMENTS

Figure 4:
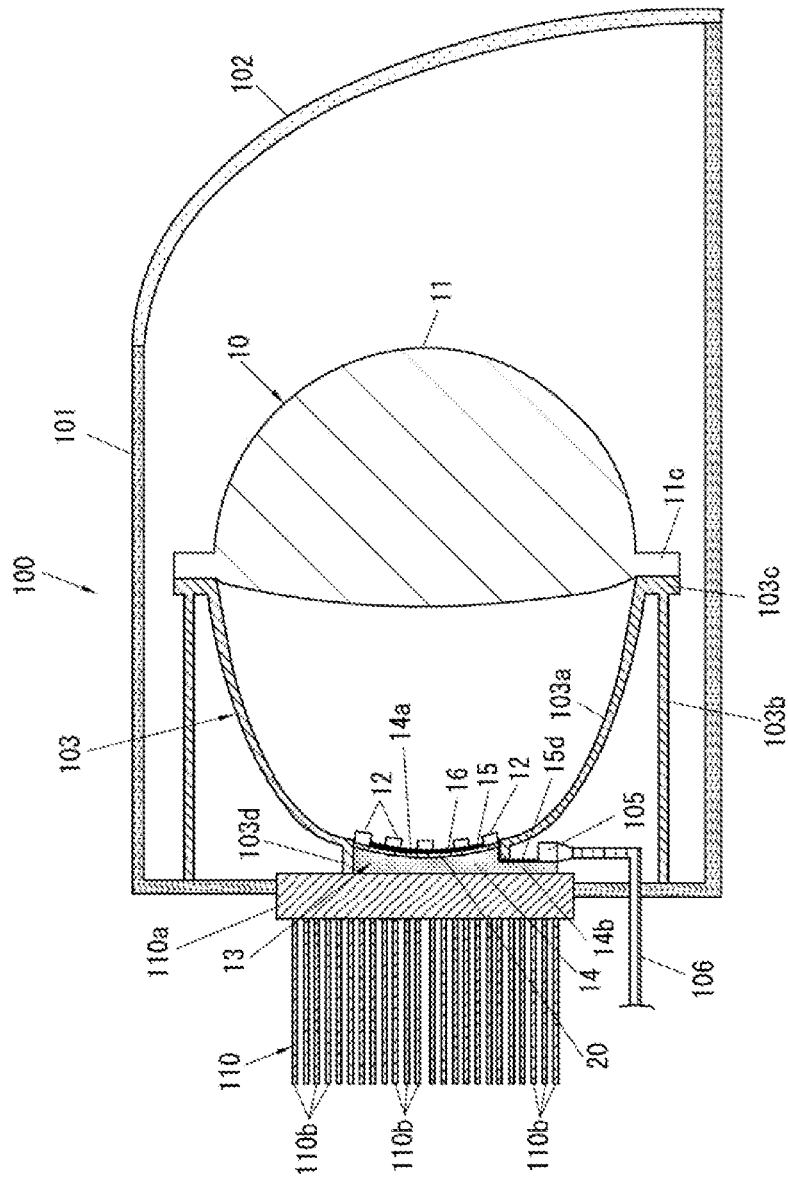
FIG. 4 is a cross-sectional view illustrating a schematic configuration of a headlight in a first example according to the first embodiment of the present invention.

Hereinafter, embodiments of the present invention will be described with reference to the drawings.

First Embodiment

FIG. 1 is a schematic cross-sectional view schematically illustrating a schematic configuration of an optical apparatus according to a first embodiment, and FIG. 2 is a schematic cross-sectional view for describing a relationship between light emitted from solid-state light sources and a lens.

As illustrated in FIGS. 1 and 2, an optical apparatus 10 in the present embodiment includes a lens 11, a plurality of solid-state light sources 12, and a substrate 13 on which the solid-state light sources 12 are mounted.

The lens 11 is an aspherical lens formed in a convex shape. The lens 11 may be a glass lens such as a glass molded lens or a resin lens such as a resin molded lens. The lens 11 includes a light-receiving surface 11a for receiving light from the solid-state light sources 12, and an emission surface 11b for emitting refracted light that has entered from the light-receiving surface 11a. The light-receiving surface 11a and the emission surface 11b are both convex aspherical surfaces.

In the present embodiment, the lens 11 is a biconvex aspherical lens, but may be a plano-convex or meniscus convex lens. In addition, regarding a curved surface, either one of the surfaces or both surfaces may be spherical.

The solid-state light source 12 denotes a solid-state device that supplies a certain solid body (substance) with energy such as electricity and emits light specific to the substance when excited. In the present embodiment, an LED is used. Note that the solid-state light source 12 may be a semiconductor laser (LD) or an organic EL (OEL).

In addition, in the present embodiment, all of the plurality of solid-state light sources 12 are LEDs that emit the same white light.

The substrate 13 includes a base material 14, which is rigid, and a mount surface 16, which is formed on the base material 14 in a curved surface shape that substantially matches the focal plane shape of the lens 11, and on which a circuit pattern 15 is formed. The focal plane shape is an aspherical one, and the mount surface 16 is formed in an aspherical shape similar to the focal plane shape.

Note that in FIGS. 1 and 2, a broken line indicated by a sign S denotes the focal plane of the lens 11 for a predetermined wavelength (here, e line, 546 nm, green) as an average of white light. In a case where the focal plane S is formed in an aspherical shape and the emission surface of the solid-state light source 12 is the surface of solid-state light source 12, the focal plane S is located at the same position with the surface of the solid-state light source 12. However, in the present embodiment, the emission surface of solid-state light source 12 is located at a position recessed inward from the surface of solid-state light source 12, and thus the focal plane S is present at such a position.

The base material 14 is formed of metal, ceramic, or a highly heat-conductive resin, and includes a formation surface 14a, which is formed in a curved surface shape that substantially matches the focal plane shape of the lens 11. Further, the formation surface 14a is formed in an aspherical shape similar to the focal plane shape.

Such a formation surface 14a may be formed at the same time when the base material 14 is manufactured, or the base material 14 that does not include the formation surface 14a may be manufactured, and then the formation surface 14a may be formed.

In a case where the formation surface 14a is formed at the same time when the base material 14 is manufactured, a mold for forming the base material 14 is filled with a material such as a molten metal or a molten resin, and additionally, the material is brought into close contact with a formation imparted surface (a surface for forming the formation surface 14a) provided in the mold, and then the mold is released so as to form the base material 14 including the formation surface 14a. In addition, in a case where the formation surface 14a is formed in post-processing, the formation surface 14a is formed by processing a predetermined part of the base material 14 by processing means such as cutting or grinding.

On the formation surface 14a that has been formed in this manner, an insulating layer 20 having an electrical insulation property and including a surface to serve as the mount surface 16 is formed. Further, as described above, the mount surface 16 is formed in a curved surface shape that substantially matches the focal plane shape of the lens 11, and the circuit pattern 15 is formed on the mount surface 16. In addition, the thickness of the insulating layer 20 is desirably 0.01 mm to 5.0 mm. In a case where the thickness of the insulating layer is smaller than 0.01 mm, there is an increased possibility that the electrical insulation is partially broken and a short circuit occurs by the processing in the step of forming a circuit or the like, thus leading to degradation in the yield. In addition, in a case where the thickness of the insulating layer is larger than 5 mm, the heat resistance of the insulating layer inhibits the heat at the time when the solid-state light sources emit light from escaping to the base material 14, which will degrade the long-term reliability of the solid-state light sources.

Such an insulating layer 20 is formed in a method for insert molding (integral molding) by disposing the base material 14 including the formation surface 14a in a mold and then injecting and filling a thermoplastic resin in the mold to form the insulating layer 20 made of a resin. In addition to this, conceivable methods include a method for filling and curing a thermosetting resin in the mold, a method for filling and solidifying the thermoplastic resin or the thermosetting resin, and then forming the mount surface 16 in post-processing such as cutting, and the like. In addition, as the insulating layer, there is another conceivable method for spraying aluminum oxide and an insulating ceramic layer on the base material 14, and then forming the mount surface 16 by cutting/grinding.

Further, the insulating layer 20 can also be formed by applying a thermosetting resin material such as an epoxy material or a photopolymerizable material dissolved in an organic solvent with a dispenser or by spray application to form an insulating layer, and then curing the insulating layer with heat or light (ultraviolet light).

In order to improve the adhesion between the formation surface 14a and the insulating layer 20, the surface of the formation surface 14a may be porous or roughened by etching with an acid alkali, a chemical technique such as chemical conversion treatment or anodization, or a physical technique such as dry or wet blasting, so that the surface shapes of the formation surface 14a and the lower surface of the insulating layer 20 are not physically separated. The surface of the formation surface 14a may be subject to plasma treatment to improve the adhesion between the formation surface 14a and the insulating layer 20.

The insulating layer 20 insulates the circuit pattern 15, which is formed on the mount surface 16, which is its upper surface (surface) of the insulating layer 20, from the base material 14.

Regarding the resin for forming the insulating layer 20, it is preferable to use a thermoplastic resin or a thermosetting resin having solder reflow resistance, heat resistance, and a high melting point. As the thermoplastic resin, for example, aromatic polyamides such as 6T nylon (6TPA), 9T nylon (9TPA), 10T nylon (10TPA), 12T nylon (12TPA) and MXD6 nylon (MXDPA) and alloy materials thereof, polyphenylene sulfide (PPS), liquid crystal polymer (LCP), polyetheretherketone (PEEK), polyetherimide (PEI), polysulfone (PSF), polyimide (PI), syndiotactic polystyrene, heat-resistant polyolefin resins such as polymethylpentene and heat-resistant cycloolefin, heat-resistant acrylic, heat-resistant polyester, and the like can be used. As the thermosetting resin, epoxy, silicone resin, urea resin (melamine resin, urea resin, and the like), and the like can be used. An inorganic filler for increasing the heat conductivity may be added to these resins.

As illustrated in FIGS. 2(a) and 2(b), the solid-state light sources 12 mounted on the mount surface 16, which serves as the surface of the insulating layer 20, are desirably mounted such that angles θ (θ1, θ2, and θ3) at which the lens 11 is viewed from normal directions of emission surfaces of the solid-state light sources are substantially equal in angle to each other. Although the plurality of solid-state light sources 12 are provided, the angles θ at which the lens 11 is viewed from the normal direction of the emission surfaces of the solid-state light sources 12 are not equal for all the solid-state light sources 12. However, in one solid-state light source 12, left and right angles θ at which the lens is viewed interposing the normal line are substantially equal to each other.

Furthermore, as illustrated in FIG. 2(b), all the solid-state light sources 12 are each mounted such that an angle α formed between its emission surface and a tangent plane of the mount surface 16 falls within 20 milliradians.

Further, as a method for forming the circuit pattern 15 on the mount surface 16, conceivable methods include a method for directly drawing a circuit pattern on an insulating layer of a curved surface with a conductive ink in which fine particles of silver or copper are dispersed in an organic binder or a conductive ink in which a conductive organic compound is dispersed in an organic solvent by use of a dispenser, an ink jet printer, or the like, and applying heat treatment as necessary to form a circuit, a method for forming a resist layer on the mount surface 16, in a similar manner to the formation of a typical circuit pattern, patterning using a circuit pattern mask and an exposure machine or forming a circuit pattern by etching after patterning by use of a direct drawing machine such as an electron beam or a laser, metallizing in vacuum film formation or plating, and finally removing a resist part and an excessive metallized part to form a circuit part, a method for forming a metal thin film of copper, nickel, or the like on the mount surface 16, removing an unnecessary part by use of a laser, and then forming a conductive layer with electroless or electrolytic plating, a method for forming a layer for suppressing the action of a catalyst to serve as a growth start point of electroless plating on the mount surface 16, and then physically removing this layer by use of a laser or the like, growing the electroless plating only on this removed part, and continuously forming a conductive layer with electroless and electrolytic plating as necessary to form a circuit part, and a method for roughening a surface of an area to become a circuit pattern on the mount surface 16 by use of a laser, a blasting device, or the like, adsorbing a catalyst to serve as the growth start point of electroless plating on such a roughened part to grow the electroless plating only on the pattern part, and continuously forming a conductive layer through electroless and electrolytic plating as necessary to form a circuit part. In addition, in order to improve solder wettability at the time when the component parts are mounted, a plating film of tin, gold, silver, or the like may be formed on the outermost surface of the circuit pattern 15.

Further, after the circuit pattern 15 is formed, the solder resist layer for protecting the circuit part may be formed in areas other than a component mount part.

The plurality of solid-state light sources 12 are mounted on the mount surface 16, on which the circuit pattern 15 is formed, and are electrically connected with the circuit pattern 15. Then, the substrate 13 is positioned with respect to the lens 11 such that the position of the focal plane S of the lens 11 substantially coincides with the positions of the emission surfaces of the plurality of solid-state light sources 12.

In addition, as illustrated in FIG. 1, the substrate 13 is positioned with respect to the lens 11 such that a line LC connecting the centers of the respective light-emitting surfaces of the plurality of solid-state light sources 12 substantially coincides with the focal plane S of the lens 11 in a cross-sectional view, or is present at a position spaced apart from the focal plane S in an optical axis direction of the lens 11. Note that in FIG. 1, in order to illustrate the connecting line LC, the connecting line LC is shifted from the focal plane S of the lens 11 in the optical axis direction of the lens 11 in the cross-sectional view. However, actually, the connecting line LC substantially coincides with the focal plane S of the lens 11.

Regarding the position spaced apart from the focal plane S in the optical axis direction of the lens 11, the plurality of solid-state light sources 12 are preferably disposed to satisfy the range that $0.5 \leq L/f \leq 2$, in a case where f denotes the focal distance of the lens 11, and L denotes a distance between a light source-side principal point of the lens 11 and a point at which "a line LC connecting the centers of the light-emitting surfaces of the plurality of solid-state light sources 12" is traversed by the optical axis of the lens 11. By setting such a range, it is preferable because divergence of the light and light amount fluctuation are suppressed. In a case where L/f is smaller than 0.5, the divergence degree of the light becomes too large, and is not preferable. In a case where L/f is larger than 2, the imaging position on an image side is too close to a light source side, and the light amount fluctuation due to the distance increases, and is not preferable.

Regarding Li, which is a distance connecting a light emission center of each solid-state light source 12 and the principal point of the lens 11 (i=1 to n, n is the total number of the solid-state light sources 12 in the corresponding layer), in a case where an average of Li is set to L (=(L1+L2+ . . . +Ln)/n), it is desirable to dispose the plurality of solid-state light sources 12 to satisfy $0.5 \leq L/f \leq 2$, using such L and the focal distance f (focal distance at a design wavelength) of the lens 11. By setting such a range, it is preferable because divergence of the light and light amount fluctuation are suppressed. By setting such a range, it is preferable because the divergence of the light and the light amount fluctuation are suppressed. In a case where L/f is smaller than 0.5, the divergence degree of the light becomes too large, and is not preferable. In a case where L/f is larger than 2, the imaging position on an image side is too close to a light source side, and the light amount fluctuation due to the distance increases, and is not preferable.

In addition, the focal distance varies depending on the wavelength or wavelength distribution of the solid-state light sources 12. However, in the present embodiment, the wavelengths or wavelength distributions of the plurality of solid-state light sources 12 are the same. Therefore, the mount surface 16 is positioned with respect to lens 11 in accordance with the wavelength (average wavelength, characteristic wavelength, or the like). That is to say, the substrate 13 is positioned with respect to the lens 11 such that focal plane S of the lens 11 substantially coincides with the positions of the emission surfaces of the plurality of solid-state light sources 12. Accordingly, the mount surface 16 is positioned with respect to the lens 11 in accordance with the wavelength.

Note that in the present embodiment, the insulating layer 20 is provided on the surface of the base material 14, and the circuit pattern 15 is formed on the mount surface 16, which is the surface of the insulating layer 20. However, without the provision of the insulating layer 20, the circuit pattern 15 may be directly formed on the formation surface 14a of the base material 14, which is formed in a curved surface shape that substantially matches the focal plane shape of the lens 11. In this case, it is sufficient if the base material 14 is formed of an electrically insulating material.

In order to manufacture the optical apparatus 10 configured as described above according to the present embodiment, first, the substrate 13 is manufactured as follows.

That is to say, first, the base material 14 is arranged in a mold, and then the insulating layer 20 is molded by insert molding (integral molding) of injecting and filling a thermoplastic resin or a thermosetting resin into the mold.

Such an insulating layer 20 includes the mount surface 16 such that the line connecting the centers of the light-emitting surfaces of the plurality of solid-state light sources 12 substantially coincides with the focal plane S of the lens 11 in the cross-sectional view, or is present at a position spaced apart from the focal plane S in the optical axis direction of the lens 11.

The base material 14 may be formed beforehand by injection molding, casting, or the like, and the formation surface 14a may be subject to finishing processing as necessary. The formation surface 14a of the base material 14 may be formed at the same time when the base material 14 is manufactured, or the base material 14 that does not include the formation surface 14a may be manufactured, and then the formation surface 14a may be formed.

In addition, in order to improve the adhesion between the formation surface 14a of the base material 14 and the insulating layer 20, an uneven layer or a porous layer may be formed on the surface of the formation surface 14a by, for example, a chemical treatment such as nano molding technology (NMT) or a physical treatment such as blasting. The surface of the formation surface 14a may be subject to plasma treatment using reduced pressure plasma or atmospheric pressure plasma, or a coupling agent such as a silane coupling agent may be applied.

Next, the circuit pattern 15 formed of a plating film is formed on the surface of the insulating layer 20, that is, on the mount surface 16. A method for forming the circuit pattern 15 is not particularly limited, and a general-purpose method can be used. Examples of the method include a method for patterning the plating film with a photoresist and removing the plating film in parts other than the circuit pattern by etching, and a method for irradiating a part where the circuit pattern is desired to be formed with a laser beam to roughen the base material, or a method for applying a functional group to form the plating film only in a part irradiated with the laser beam. Other than the above methods, the circuit pattern can also be formed in a method of patterning conductive ink on the mount surface using a dispenser or the like.

Next, the plurality of solid-state light sources 12 are mounted on predetermined positions of the mount surface 16, on which the circuit pattern 15 is formed, by use of a known chip mounter, and are made to be electrically connected with the circuit pattern 15 using solder, conductive paste, or the like.

In this case, as illustrated in FIG. 2, the respective solid-state light sources 12 are mounted on the mount surface 16 such that the angles θ (θ1, θ2, and θ3) at which the lens 11 is viewed from the normal directions of the emission surfaces are substantially equal in angle to each other, and are mounted on the mount surface 16 such that the angles formed between the emission surfaces of all the solid-state light sources 12 and the tangent plane of the mount surface 16 fall within 20 milliradians.

In addition, as illustrated in FIG. 2A, in a case where the respective solid-state light sources 12 are mounted on the mount surface 16 such that normal lines NL of the emission surfaces pass through the front-side principal point (light source-side principal point) MP of the lens 11 or its vicinity, the emission light from the solid-state light sources 12 may be made available as the irradiation light in a more efficient manner. In this case, in order to mount the solid-state light sources 12 such that the normal lines NL of the emission surfaces of the solid-state light sources 12 pass through the front-side principal point MP of the lens 11 or the vicinity of the principal point, as illustrated in FIG. 2B(a), the solid-state light sources 12 can be easily and accurately mounted by being formed on the mount surface 16 in a shape of defining the mount positions beforehand such that the normal lines NL of the solid-state light sources 12 pass through the principal point MP of the lens 11 and the focal plane S of the lens 11 is located in the vicinity of the emission surfaces of the solid-state light sources 12. In such a situation, as illustrated in FIG. 2(b), each solid-state light source 12 is desirably mounted such that an angle φ formed by a line connecting the center of each solid-state light source 12 and the principal point MP and the normal line of the emission surface of each solid-state light source 12 falls within 20 milliradians. The method for forming the shape of defining the mount positions beforehand on the mount surface 16 and mounting the solid-state light sources on them is similarly effective also in other examples.

For example, as illustrated in FIG. 3, after having been disposed in three rows in parallel with one another, the plurality of solid-state light sources 12 may be mounted on the mount surface 16 of the substrate 13. However, a disposed state in which the solid-state light sources 12 are mounted is not limited to that illustrated in FIG. 3. The mount surface 16 is formed in a curved surface shape that substantially matches the focal plane shape of the lens 11. Therefore, by mounting the solid-state light sources 12 on desired (any) positions of the mount surface 16, the substrate 13 can be positioned with respect to the lens 11 such that the focal plane of the lens 11 substantially coincides with the positions of the emission surfaces of the plurality of solid-state light sources 12.

When the substrate 13 is positioned with respect to the lens 11, for example, the positioning may be performed by fixing the lens 11 to a case of the optical apparatus 10 such as an illumination apparatus and then moving the substrate 13 to contact or separate from the lens 11 in the optical axis direction. Conversely, the positioning may be performed by fixing the substrate 13 to the case and then moving the lens 11 to contact or separate from the substrate 13 in the optical axis direction, or may be performed by moving both the substrate 13 and the lens 11 to contact or separate from each other in the optical axis direction.

After the positioning ends, the lens 11 and/or the substrate 13 is fixed to the case, and then manufacturing of the optical apparatus 10 ends.

FIG. 4 is a cross-sectional view illustrating a schematic configuration of a headlight 100, in a first example, including the above-described optical apparatus 10.

As described above, the optical apparatus 10 includes the lens 11, the plurality of solid-state light sources 12, and the substrate 13, on which the solid-state light sources 12 are mounted.

The substrate 13 includes the base material 14, which is rigid, and the insulating layer 20, which is formed on the formation surface 14*a* of the base material 14, and the surface of the insulating layer 20 serves as the mount surface 16. The circuit pattern 15 is formed on the mount surface 16.

The headlight 100 includes the optical apparatus 10, a housing 101, in which the optical apparatus 10 is housed, an outer lens 102, which is provided on a front surface side of the housing 101, and a reflector 103.

The housing 101 is formed in a box shape that opens on a front surface side, and the outer lens 102 is provided in the opening so as to face the lens 11 of the optical apparatus 10.

The reflector 103 includes a reflector main body 103*a*, which has a cup shape formed in a substantially letter U shape in a cross-section, and which includes an inner surface serving as a reflecting surface, and a support part 103*b* for supporting and fixing the reflector main body 103*a* to the housing 101. The support part 103*b* is formed in a cylindrical shape, a flange part 103*c* having an annular plate shape is provided at its tip end portion (right end portion in FIG. 4), and a base end portion (left end portion in FIG. 4) is fixed to a bottom surface of the housing 101.

The lens 11 includes a flange part 11*c*, which has an annular plate shape, on its outer circumferential portion, and the lens 11 is supported at a predetermined position of the housing 101 by the flange part 11*c* fixed to the flange part 103*c* of the support part 103*b*.

In addition, on a bottom surface of the reflector main body 103*a*, an opening for exposing the solid-state light sources 12 of the optical apparatus 10 is provided. Furthermore, a holding wall 103*d* having a tubular shape is provided at a bottom part of the reflector main body 103*a*, and the substrate 13 is held inside the holding wall 103*d*.

In addition, an opening is provided in a part of the holding wall 103*d*, and a part of the base material 14 extends from such an opening. A connector 105 is provided in an extension part 14*b*, which extends, and the connector 105 and the circuit pattern 15 are connected with each other by a wiring pattern 15*d*. The connector 105 and a power supply, not illustrated, are connected with each other by a cable 106.

Further, a heat sink 110 is provided at a bottom part of the housing 101. The heat sink 110 includes a heat sink main body 110*a*, and a plurality of heat dissipation fins 110*b* provided on a back side of the heat sink main body 110*a*.

The heat sink main body 110*a* is formed in a plate shape, and its surface is exposed to the inside of the housing 101. The base material 14 of the substrate 13 is in close contact with such an exposed surface of the heat sink main body 110*a*. Therefore, heat generated from the solid-state light sources 12 is partially transferred through the insulating layer 20 and the base material 14 to the heat sink main body 110*a*, and is radiated to the outside by the heat dissipation fins 110*b*, so that the solid-state light sources 12 can be prevented from overheating.

Figure 5:
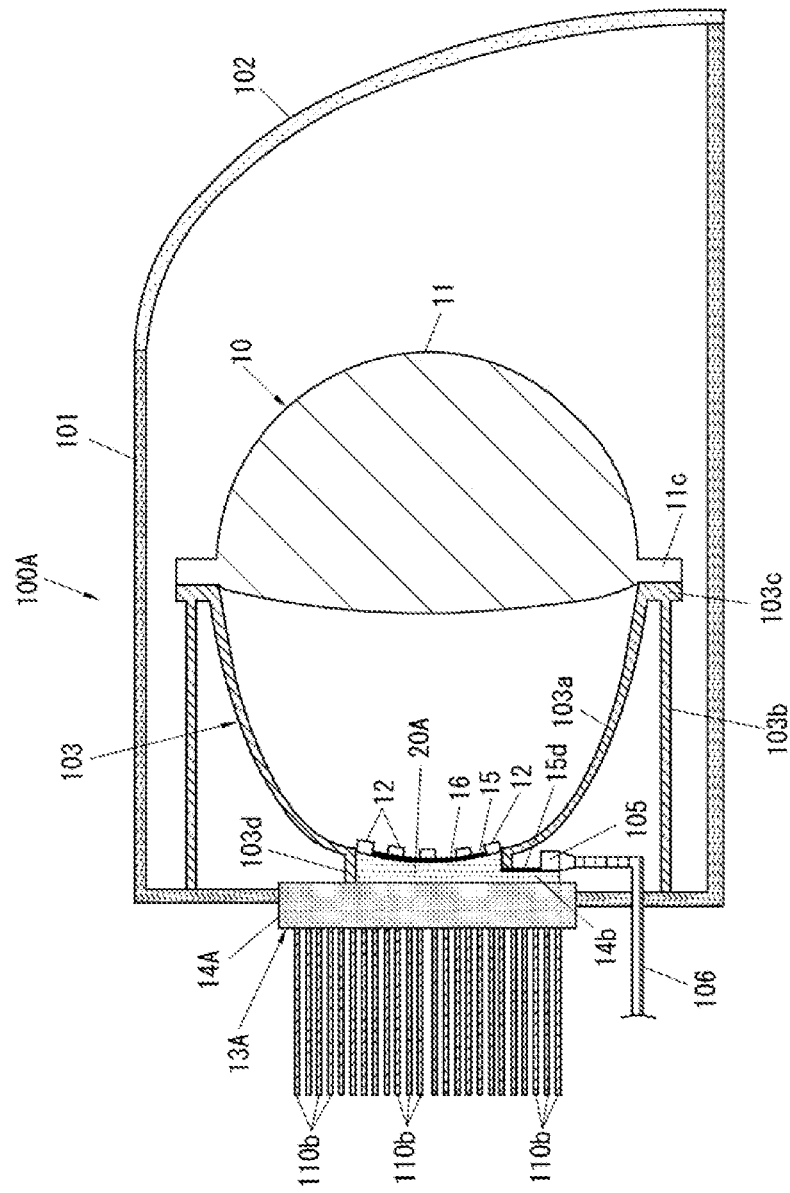
FIG. 5 is a cross-sectional view illustrating a schematic configuration of a headlight in a second example according to the first embodiment of the present invention.

FIG. 5 is a cross-sectional view illustrating a schematic configuration of a headlight 100A in a second example.

The headlight 100A is different in the configuration of the substrate from the headlight 100 in the first example. Therefore, this point will be described below, and the same reference numerals are given to the same configurations as those of the headlight 100 in the first example, and description thereof will be omitted.

A substrate 13A of the headlight 100A in the second example includes a base material 14A, which is rigid, and an insulating layer 20A, which is provided on the base material 14A.

The base material 14A is formed of a highly heat-conductive material, and also has a function of a heat sink. The base material 14A is formed in a plate shape, its surface is exposed to the inside of the housing 101, and a plurality of heat dissipation fins 110*b* are provided on a back surface of the base material 14A.

The insulating layer 20A is formed of a highly heat-conductive resin, its surface is formed in a curved surface shape that substantially matches the focal plane shape of the lens 11, and includes the mount surface 16, on which the circuit pattern 15 is formed. The focal plane shape is an aspherical one, and the mount surface 16 is formed in an aspherical shape similar to the focal plane shape.

The insulating layer 20A is held inside the holding wall 103*d*, which has a tubular shape, and which is provided at the bottom part of the reflector main body 103*a*.

An opening is provided in a part of the holding wall 103*d*, and a part of the insulating layer 20A extends from such an opening. A connector 105 is provided in an extension part 14*b*, which extends, and the connector 105 and the circuit pattern 15 are connected with each other by a wiring pattern 15*d*. The connector 105 and a power supply, not illustrated, are connected with each other by a cable 106.

In the headlight 100A in the second example, the base material 14A also functions as a heat sink, and thus there is an advantage that the configuration is simplified as compared with the headlight 100 in the first example.

As described heretofore, according to the present embodiment, the substrate 13 includes the mount surface 16, which is formed in a curved surface shape that substantially matches the focal plane shape of the lens 11, on the insulating layer 20 formed on the base material 14, which is rigid. The plurality of solid-state light sources 12 are mounted on the mount surface 16, and the substrate 13 is positioned with respect to the lens 11 such that the position of the focal plane of lens 11 substantially coincides with the positions of the emission surfaces of the solid-state light sources 12. Therefore, the field curvature can be easily corrected by the lens 11 such that light emitted from the plurality of solid-state light sources 12 toward the lens 11 is made to emit from the lens 11 as parallel light substantially parallel to the optical axis.

In addition, the base material 14 is formed of metal, ceramic, or a highly heat-conductive resin. Therefore, heat generated by the solid-state light sources 12 is partially transferred to the base material 14, and can be radiated from the base material 14, so that the solid-state light sources 12 can be suppressed from overheating.

Furthermore, the base material 14 includes a formation surface 14a formed in a curved surface shape that substantially matches the focal plane shape of the lens 11, and the insulating layer 20 having a surface to serve as the mount surface 16 is formed on the formation surface 14a. Therefore, the surface of the insulating layer 20, that is, the mount surface 16 can be easily formed in a curved surface shape that substantially matches the focal plane shape of the lens.

In addition, the curved surface shapes of the mount surface 16 and the formation surface 14a are made in an aspherical shape. Thus, also in a case where the lens 11 includes the light-receiving surface 11a and the emission surface 11b each having an aspherical shape, the field curvature can be easily corrected.

In addition, the solid-state light sources 12 are mounted such that angles θ at which the lens 11 is viewed from the normal directions of the emission surfaces are substantially equal in angle. Therefore, the light emitted from the solid-state light sources 12 is effectively taken into light the light-receiving surface 11a of the lens 11, and the lens 11 can be uniformly irradiated with the light.

Further, the solid-state light sources 12 are each mounted such that the angle formed between the emission surface and the tangent plane of the mount surface 16 falls within 20 milliradians. Therefore, the solid-state light sources 12 can be mounted on the mount surface 16 in a state close to an ideal one.

Further, for a simpler configuration, the base material 14A and the heat dissipation fins 110b may be formed together with the insulating layer 20.

In the example of FIG. 4, an LED and an LED lighting circuit are connected with each other by the cable 106. However, a part, a diagram, or the entirety of a power supply circuit for lighting the LED and a lighting circuit may be provided in the vicinity of the connector 105 of the base material 14. By integrating the light source part, the power supply circuit, and the lighting circuit with the base material 14, downsizing including a circuit as an illumination device can be achieved. In the wiring of the power supply circuit, the lighting circuit, and the LED, the thickness of the wiring may be different depending on the electric current to flow, the line width of the circuit depending on the component size to be mounted, and a space between adjacent pieces of wiring.

Second Embodiment

Figure 6:
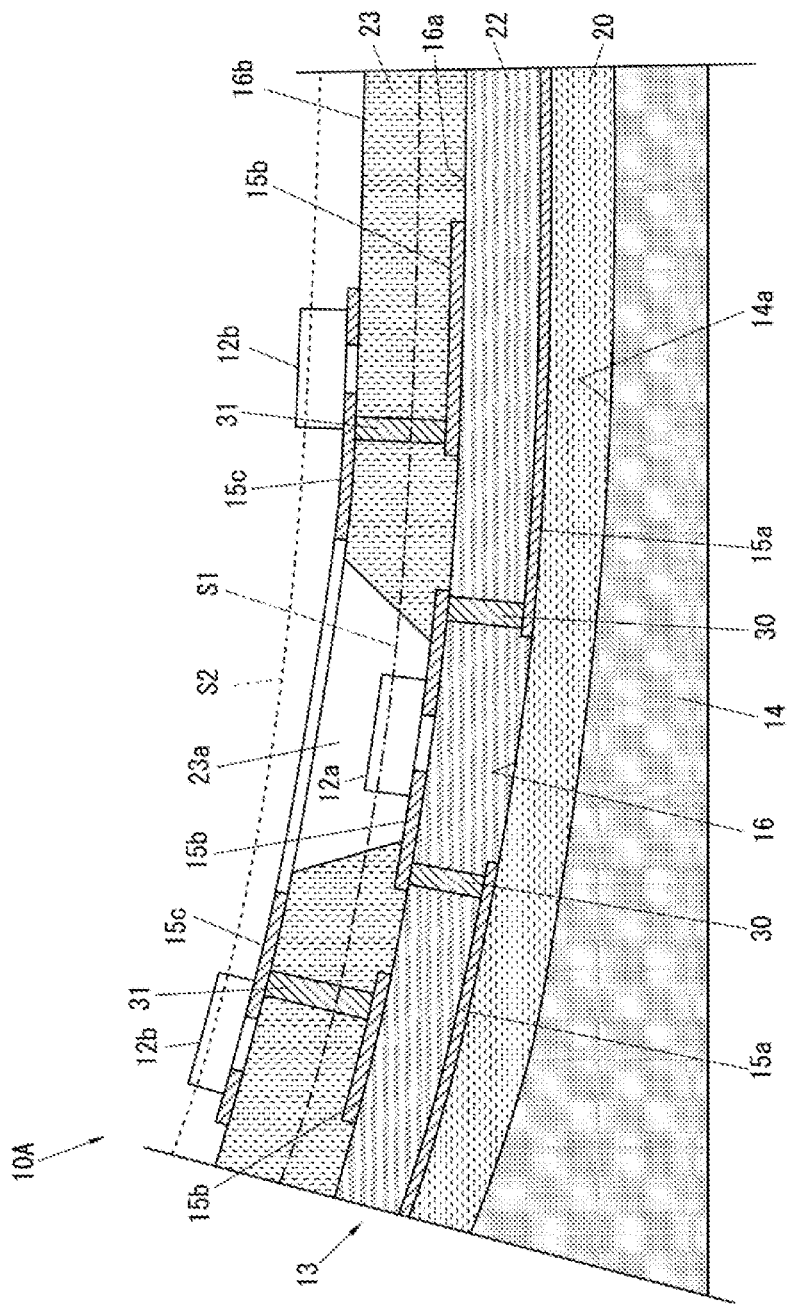
FIG. 6 is a schematic cross-sectional view schematically illustrating a schematic configuration of a substantive part of an optical apparatus according to a second embodiment of the present invention.

FIG. 6 illustrates an optical apparatus according to a second embodiment, and is a schematic cross-sectional view of a substantive part.

The present embodiment is mainly different from the first embodiment in that a plurality of insulating layers are stacked. Therefore, this point will be described below, and the same reference numerals are given to the same configurations as those in the first embodiment, and description thereof will be omitted, in some cases.

Note that in the present embodiment, the above-described insulating layer 20 will be referred to as a first insulating layer 20.

As described above, the first insulating layer 20 is formed on the formation surface 14a of the base material 14, which is rigid, and a second insulating layer 22 is formed on an upper surface of the insulating layer 20. In addition, a circuit pattern 15a is formed on an upper surface of the first insulating layer 20. Here, in the first embodiment, the solid-state light sources 12 are mounted on the mount surface 16, which is the upper surface of insulating layer 20. However, in the present embodiment, no solid-state light source 12 is mounted on the mount surface 16. However, the solid-state light sources 12 may be mounted on the mount surface 16.

In addition, an upper surface of the second insulating layer 22 serves as a mount surface 16a, and such a mount surface 16a is formed in a curved surface shape that substantially matches the focal plane shape of the lens 11. The second insulating layer 22 includes the mount surface 16a, which substantially coincides with a focal plane S1 of the lens 11 in a cross-sectional view, or which is present at a position spaced apart from the focal plane S1 in the optical axis direction of the lens 11.

Further, a circuit pattern 15b is formed on the mount surface 16a. Then, a first solid-state light source 12a is mounted on the mount surface 16a, and such a solid-state light source 12a is electrically connected with the circuit pattern 15b.

In general, the position of the focal plane of the lens varies depending on the wavelength of the solid-state light source. Hence, the mount surface 16a is positioned with respect to the lens 11 such that the position of the focal plane S1 of the lens 11 with respect to the first solid-state light source 12a substantially coincides with the position of the emission surface of the first solid-state light source 12a.

Note that although one first solid-state light source 12a is mounted on the mount surface 16a in FIG. 6, a plurality of first solid-state light sources are actually mounted on the mount surface 16a at predetermined intervals.

In addition, the first solid-state light source 12a is disposed in a third insulating layer 23, to be described later, so as to be exposed to an opening 23a formed to taper from a mount surface 16b of the insulating layer 23 toward a mount surface 16a below the mount surface 16b, and is then mounted on the mount surface 16a.

Further, in the second insulating layer 22, a through hole 30 is formed to penetrate through the second insulating layer 22. A copper plating film is formed on the inner surface of the through hole 30, and the circuit patterns 15a and 15b are electrically connected with each other by such a copper plating film. Therefore, the first solid-state light source 12a mounted on the mount surface 16a of the second insulating layer 22 is electrically connected with the circuit pattern 15a, which is formed on the upper surface (mount surface) 16 of the first insulating layer 20 via the circuit pattern 15b and the through hole 30.

In addition, the third insulating layer 23 is formed on the upper surface of the second insulating layer 22, that is, on the mount surface 16a. An upper surface of the third insulating layer 23 serves as the mount surface 16b, and the mount surface 16b is formed in a curved surface shape that substantially matches the focal plane shape of the lens 11. Further, a circuit pattern 15c is formed on the mount surface 16b. Then, a second solid-state light source 12b is mounted on the mount surface 16b, and such a solid-state light source 12b is electrically connected with the circuit pattern 15c.

Then, the mount surface 16b is positioned with respect to the lens 11 such that the focal plane S2 of the lens 11 with respect to second solid-state light source 12b substantially coincides with the emission surface of the second solid-state light source 12b.

In addition, in the third insulating layer 23, through holes 31 are formed to penetrate through the third insulating layer 23. A copper plating film is formed on the inner surface of the through hole 31, and the circuit patterns 15b and 15c are electrically connected by such a copper plating film. Therefore, the second solid-state light source 12b mounted on the mount surface 16b of the third insulating layer 23 is electrically connected with the circuit pattern 15b, which is formed on the upper surface (mount surface) 16a of the second insulating layer 22 via the circuit pattern 15c and the through hole 31.

Further, in a similar manner to the first embodiment, the solid-state light sources 12a and 12b respectively mounted on the mount surfaces 16a and 16b are mounted such that the angles θ at which the lens 11 are viewed from the normal directions of the emission surfaces are substantially equal in angle to each other. Furthermore, in a similar manner to the first embodiment, all the solid-state light sources 12a and 12b are respectively mounted such that the angles between the emission surfaces and the tangent planes of the mount surfaces 16a and 16b fall within 20 milliradians.

A plurality of solid-state light sources 12a and 12b are respectively mounted on the mount surfaces 16a and 16b. Then, the substrate 13 is positioned with respect to the lens 11 such that the focal plane S1 of the lens 11 substantially coincides with the emission surfaces of the plurality of solid-state light sources 12a, and the focal plane S2 of the lens 11 substantially coincides with the emission surfaces of the plurality of solid-state light sources 12b.

In addition, the substrate 13 is positioned with respect to the lens 11 such that a line connecting the centers of the respective light-emitting surfaces of the plurality of solid-state light sources 12a substantially coincides with the focal plane S1 of the lens 11 in a cross-sectional view, or is present at a position spaced apart from the focal plane S1 in the optical axis direction of the lens 11.

Furthermore, the substrate 13 is positioned with respect to the lens 11, such that a line connecting the centers of the light-emitting surfaces of the plurality of solid-state light sources 12b and 12b substantially coincides with focal plane S2 of the lens 11 in a cross-sectional view, or is present at a position spaced apart from the focal plane S2 in the optical axis direction of the lens 11.

In addition, the focal distance varies depending on the wavelength of the solid-state light source, and thus the mount surfaces 16a and 16b are positioned with respect to the lens 11 in accordance with the wavelength. That is to say, the substrate 13 is positioned with respect to the lens 11 such that the focal plane S1 of the lens 11 substantially coincides with the positions of the emission surfaces of the plurality of solid-state light sources 12a, and the focal plane S2 of the lens 11 substantially coincides with the positions of the emission surfaces of the plurality of solid-state light sources 12b. Thus, the mount surfaces 16a and 16b are positioned with respect to the lens 11 in accordance with the wavelength.

In order to manufacture an optical apparatus 10A, which is configured as described above according to the present embodiment, first, the substrate 13 is manufactured as follows.

That is to say, first, the base material 14 is arranged in a mold, and then the first insulating layer 20 is molded by insert molding (integral molding) of injecting and filling a thermoplastic resin or a thermosetting resin into the mold. Note that in order to improve the adhesion between the formation surface 14a of the base material 14 and the insulating layer 20, the formation surface 14a may be subject to, for example, a chemical treatment such as nano molding technology (NMT) to make the formation surface 14a an uneven or porous surface. The formation surface 14a may be roughened by a physical technique such as sandblasting. The surface of the formation surface 14a may be subject to plasma treatment using reduced pressure plasma or atmospheric pressure plasma, or a coupling agent such as a silane coupling agent may be applied.

Next, the circuit pattern 15a formed of a plating film is formed on the surface of the first insulating layer 20, that is, on the mount surface 16. The method for forming the circuit pattern 15a is not particularly limited, and a general-purpose method using the above-described photoresist, laser light, or the like can be used.

The insulating layer 20 can also be formed by applying a thermosetting resin material such as an epoxy material or a photopolymerizable material dissolved in an organic solvent with a dispenser or by spray application to form an insulating layer, and then curing the insulating layer with heat or light (ultraviolet light).

Next, the second insulating layer 22 is molded on (the mount surface 16 of) the substrate part including the base material 14, the first insulating layer 20, and the circuit pattern 15a by insert molding (integral molding) with a dispenser or by spray application, and the through hole 30 is formed in the second insulating layer 22. Note that in order to improve the adhesion between the first insulating layer 20 and the second insulating layer 22, for example, the surface of the insulating layer 20, on which the circuit pattern is formed, may be subject to plasma treatment using reduced pressure plasma or atmospheric pressure plasma. A coupling agent such as a silane coupling agent may be applied.

Next, the circuit pattern 15b formed of a plating film is formed on the surface of the second insulating layer 22, that is, on the mount surface 16a, and the circuit pattern 15b is electrically connected with the circuit pattern 15a via the through hole 30.

Note that the circuit pattern 15b is formed in a similar manner to the circuit pattern 15a.

Next, the third insulating layer 23 is molded by insert molding (integral molding) on (the mount surface 16a of) the substrate part including the base material 14, the first insulating layer 20, the second insulating layer 22, the circuit patterns 15a and 15b, and the through hole 30, and the through hole 31 is formed in the third insulating layer 23. Note that in order to improve the adhesion between the second insulating layer 22 and the third insulating layer 23, for example, plasma treatment using reduced pressure plasma or atmospheric pressure plasma may be performed, or a coupling agent such as a silane coupling agent may be applied.

Next, a circuit pattern 15c formed of a plating film is formed on the surface of the third insulating layer 23, that is, on the mount surface 16b, and the circuit pattern 15c is electrically connected with the circuit pattern 15b via the through hole 31.

Note that the circuit pattern 15c is formed in a similar manner to the circuit patterns 15a and 15b.

Finally, the solid-state light source 12a is mounted on the mount surface 16a, which is a surface of the second insulating layer 22, and is electrically connected with the circuit pattern 15, and the solid-state light source 12b is mounted on the mount surface 16b, which is a surface of the third insulating layer 23, and is electrically connected with the circuit pattern 15c.

When the substrate 13 is positioned with respect to the lens 11, for example, the positioning may be performed by fixing the lens 11 to a case of the optical apparatus 10A such as an illumination apparatus and then moving the substrate 13 to contact or separate from the lens 11 in the optical axis direction. Conversely, the positioning may be performed by fixing the substrate 13 to the case and then moving the lens 11 to contact or separate from the substrate 13 in the optical axis direction, or may be performed by moving both the substrate 13 and the lens 11 to contact or separate from each other in the optical axis direction.

After the positioning ends, the lens 11 and/or the substrate 13 is fixed to the case, and then the manufacturing of the optical apparatus 10A ends.

Note that by providing such an optical apparatus 10A in the housing 101 as described above, a headlight including the optical apparatus 10A can be obtained.

As described heretofore, according to the second embodiment, not only the same effects as those in the first embodiment can be obtained, but also the following effects can be obtained.

The second insulating layer 22 and the third insulating layer 23, which are positioned with respect to the lens 11, are included. Therefore, the mount surfaces 16a and 16b, which are respectively the surfaces of the insulating layers 22 and 23, are positioned with respect to the lens 11. Therefore, also in a case where the solid-state light sources 12a and 12b having different wavelengths are respectively mounted on the mount surfaces 16a and 16b appropriately, the field curvature can be easily corrected.

In addition, the circuit patterns 15a, 15b, and 15c respectively on the plurality of insulating layers 20, 22, and 23 are electrically connected to be selective by the through holes 30 and 31, and thus turning on and off the plurality of solid-state light sources 12a and 12b, which are connected with the circuit patterns 15b and 15c, can be easily controlled.

Further, by using this method, in disposing the solid-state light sources having the same emission wavelength or the same emission wavelength band with respect to the focal plane S of the lens 11, in a case where the light-emitting surfaces are disposed on the focal plane S, parallel light can be obtained. In a case where the solid-state light sources are disposed in a direction away from the lens 11 with respect to the focal plane S, convergent light can be obtained. Conversely, in a case where the solid-state light sources are disposed in a direction closer to the lens 11 than the focal plane S, diffused light can be obtained. In addition, wiring is enabled for the respective solid-state light sources, and thus, a single optical apparatus 10, with which the parallel light, the convergent light, and the diffused light are selectable, can be produced.

Note that in the present embodiment, the insulating layers include three layers of the first insulating layer 20, the second insulating layer 22, and the third insulating layer 23. However, the number of insulating layers may be two or four or more.

In a case of four or more layers, a plurality of insulating layers including four or more layers can be formed by repeating a predetermined number of times a step of forming another insulating layer on the third insulating layer, forming a through hole as necessary, and forming a circuit pattern on a mount surface that is a surface of the insulating layer.

Further, in the present embodiment, the circuit patterns 15a and 15b are electrically connected by the through hole 30, and the circuit patterns 15b and 15c are electrically connected by the through hole 31. However, regarding the circuit patterns formed on the mount surfaces of different insulating layers, the circuit patterns adjacent to each other in the thickness direction of the substrate 13 may be connected by a through hole, or the circuit patterns disposed with one or more circuit patterns sandwiched therebetween in the thickness direction of the substrate 13 may be connected by a through hole. In brief, the circuit patterns formed on the mount surfaces of the plurality of insulating layers may be electrically connected to be selective by a through hole.

REFERENCE SIGNS LIST 10, 10A Optical apparatus
11 Lens
12, 12a, 12b Solid-state light source
13, 13A Substrate
14, 14A Base material
14a Formation surface
15, 15a, 15b, 15c Circuit pattern
16, 16a, 16b Mount surface
20, 20A, 22, 23 Insulating layer
30, 31 Through hole
100, 100A Headlight
LN Normal line of emission surface
MP Light source-side principal point

The invention claimed is:

1. An optical apparatus comprising a lens, a plurality of solid-state light sources, and a substrate on which the solid-state light sources are mounted, wherein
   the substrate includes a base material that is rigid, and a mount surface, which is formed on the base material, which has a curved surface shape that substantially matches a focal plane shape of the lens, and on which a circuit pattern is formed,
   the solid-state light sources are mounted on the mount surface,
   the substrate is positioned with respect to the lens such that a line connecting centers of light-emitting surfaces of the plurality of solid-state light sources substantially coincides with a focal plane of the lens in a cross-sectional view, or the line is present at a position spaced apart from the focal plane in an optical axis direction of the lens, and such that a position of the focal plane of the lens substantially coincides with positions of emission surfaces of the solid-state light sources,
   the base material is formed of metal, ceramic, or a highly heat-conductive resin, and includes a formation surface formed in a curved surface shape that substantially matches the focal plane shape of the lens, and
   an insulating layer is formed on the formation surface, the insulating layer having an electrical insulation property and including a surface to serve as the mount surface.

2. The optical apparatus according to claim 1, wherein at least one another insulating layer is stacked on the insulating layer, the at least one another insulating layer being formed in a curved surface shape that substantially matches the focal plane shape of the lens and including a mount surface on which a circuit pattern is formed, and
   the circuit patterns of a plurality of insulating layers are electrically connected to be selective by a through hole formed in the insulating layer.

3. The optical apparatus according to claim 1, wherein the curved surface shape is an aspherical shape.

4. The optical apparatus according to claim 1, wherein the mount surface is positioned with respect to the lens in accordance with a wavelength of the solid-state light source.

5. The optical apparatus according to claim 1, wherein the solid-state light sources are mounted such that angles at which the lens is viewed from normal directions of emission surfaces of the solid-state light sources are substantially equal in angle to each other.

6. The optical apparatus according to claim 1, wherein the solid-state light sources are mounted such that normal lines of emission surfaces of the solid-state light sources pass through a light source-side principal point of the lens or its vicinity.

7. The optical apparatus according to claim 6, wherein the solid-state light sources are mounted such that an angle formed by a normal line of an emission surface of the solid-state light source and a line connecting a center of the emission surface and a light source-side principal point of the lens is equal to or smaller than 20 milliradians.

8. The optical apparatus according to claim 1, wherein the solid-state light sources are mounted such that an angle formed by an emission surface of the solid-state light source and a tangent plane of the mount surface falls within 20 milliradians.

9. A method for manufacturing an optical apparatus including a lens, a plurality of solid-state light sources, and a substrate on which the solid-state light sources are mounted, the method comprising:

forming an insulating layer on a base material that is rigid, the insulating layer including a mount surface, which has a curved surface shape that substantially matches a focal plane shape of the lens, such that a line connecting centers of light-emitting surfaces of the plurality of solid-state light sources substantially coincides with a focal plane of the lens in a cross-sectional view, or the line is present at a position spaced apart from the focal plane in an optical axis direction of the lens, and forming a circuit pattern on the mount surface to manufacture the substrate;

then, mounting the solid-state light sources on the mount surface of the substrate to be electrically connected with the circuit pattern; and then, positioning the substrate with respect to the lens such that a position of the focal plane of the lens substantially coincides with positions of emission surfaces of the solid-state light sources, wherein the base material is formed of metal, ceramic, or a highly heat-conductive resin, and includes a formation surface formed in a curved surface shape that substantially matches the focal plane shape of the lens, and an insulating layer is formed on the formation surface, the insulating layer having an electrical insulation property and including a surface to serve as the mount surface.

10. A method for manufacturing an optical apparatus including a lens, a plurality of solid-state light sources, and a substrate on which the solid-state light sources are mounted, the method comprising:

forming an insulating layer on a base material that is rigid, the insulating layer including a mount surface, which has a curved surface shape that substantially matches a focal plane shape of the lens, such that a line connecting centers of light-emitting surfaces of the plurality of solid-state light sources substantially coincides with a focal plane of the lens in a cross-sectional view, or the line is present at a position spaced apart from the focal plane in an optical axis direction of the lens, and forming a circuit pattern on the mount surface;

then, repeating a predetermined number of times a step of forming, on the mount surface, a next insulating layer including a mount surface, which has a curved surface shape that substantially matches the focal plane shape of the lens, such that a line connecting centers of light-emitting surfaces of the plurality of solid-state light sources substantially coincides with the focal plane of the lens in the cross-sectional view, or the line is present at a position spaced apart from the focal plane in the optical axis direction of the lens, and forming a circuit pattern on the mount surface to manufacture the substrate;

then, mounting the solid-state light sources on the mount surface of the substrate to be electrically connected with the circuit pattern; and then, positioning the substrate with respect to the lens such that a position of the focal plane of the lens substantially coincides with positions of emission surfaces of the solid-state light sources, wherein the base material is formed of metal, ceramic, or a highly heat-conductive resin, and includes a formation surface formed in a curved surface shape that substantially matches the focal plane shape of the lens, and an insulating layer is formed on the formation surface, the insulating layer having an electrical insulation property and including a surface to serve as the mount surface.

11. The method for manufacturing the optical apparatus according to claim 10, wherein the circuit patterns of a plurality of the insulating layers are electrically connected to be selective by a through hole formed in the insulating layer.

12. A headlight comprising the optical apparatus according to claim 1.

* * * * *